Feb. 27, 1962   E. F. COOK   3,022,681
SEAT ADJUSTER DRIVE UNIT

Filed May 12, 1958   2 Sheets-Sheet 1

E. F. COOK
INVENTOR.

BY *(signatures)*

ATTORNEYS

Feb. 27, 1962 E. F. COOK 3,022,681
SEAT ADJUSTER DRIVE UNIT
Filed May 12, 1958 2 Sheets-Sheet 2

E. F. COOK
INVENTOR.

BY

ATTORNEYS

United States Patent Office 3,022,681
Patented Feb. 27, 1962

3,022,681
SEAT ADJUSTER DRIVE UNIT
Ernest F. Cook, Dearborn, Mich., assignor to Ford Motor Company, Dearborn, Mich., a corporation of Delaware
Filed May 12, 1958, Ser. No. 734,474
4 Claims. (Cl. 74—665)

This invention relates to adjustable vehicle seats and more particularly to a motor drive unit adapted to be coupled to four-way seat supporting and positioning mechanism.

Power operated seat adjusting mechanism adapted to provide for four-way adjustment, that is, for up and down and fore or aft movements of the seat, are current production items on several models of automotive vehicles. One embodiment of such a mechanism comprises a motor driven tandem screw assembly. One screw, called the vertical screw, regulates the up and down movement of the seat and the second screw, called the horizontal screw, regulates the fore and aft movement of the seat. A solenoid actuated clutch is located at each end of the tandem screw. When the control switch is operated to initiate up or down seat motion, the appropriate solenoid is actuated to cause its associated clutch to operatively connect the vertical screw to the drive motor for rotation. The vertical screw rotation is translated through appropriate connections and linkage into a seat raising or lowering movement, as the case may be. When the control switch is operated to initiate fore or aft movement, the other clutch is operated to connect the horizontal screw to the drive motor. Suitable connectors and linkage translate the rotation of the horizontal screw into the desired fore or aft movement.

Although the mechanism so provided has a record of satisfactory performance, there are at least two objectionable features present which may be noted. First, the tandem screw arrangement causes the mechanism to be objectionably elongated to the extent that it almost extends beyond the vehicle seat in a fore and aft direction. Second, the mechanism as constituted requires two clutch devices and two solenoids, the duplication of parts increasing the cost of manufacture.

It is an object of the present invention to provide a motor drive unit for a seat adjuster mechanism embodying an improved positioning of the drive screws permitting a much shorter and compact mechanism. It is a further object to provide a motor drive unit utilizing only a single solenoid operated clutch to selectively cause operation of either the vertical or horizontal screw.

In its illustrated embodiment the motor drive unit which is adapted to be coupled to a four-way seat adjuster mechanism comprises a support having a longitudinally extending beam portion and upstanding appendages at each of its ends. A pair of rotatable screws are journalled at each of their ends in the appendages, the screws lying in proximate parallel relationship to the longitudinal axis and upon opposite sides of the beam portion. The screws are adapted to be rotated by an electric motor means or its equivalent. A single clutch shiftable by a single solenoid is provided to determine which of the two screws is to be driven. The clutch is arranged to be in engagement with one of the screws at all times, being shiftable into engagement with the other screw through actuation of the solenoid. As in the earlier described mechanism, one of the screws is coupled to the linkage system for raising and lowering the seat and the other screw is coupled to said slide means for moving the seat fore and aft in response to the rotation of the respective screws.

Other objects, advantages and features of the present invention will be made more apparent as the description proceeds, particularly when considered in connection with the accompanying drawing, wherein.

Figure 1:
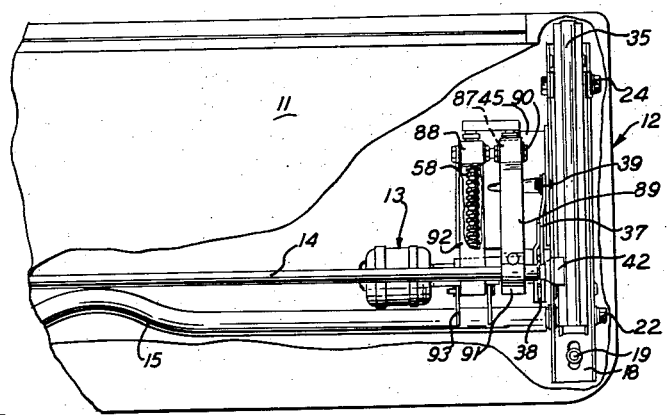
FIG. 1 is a fragmentary plan view of the seat operating mechanism embodying the present invention.
Figure 2:
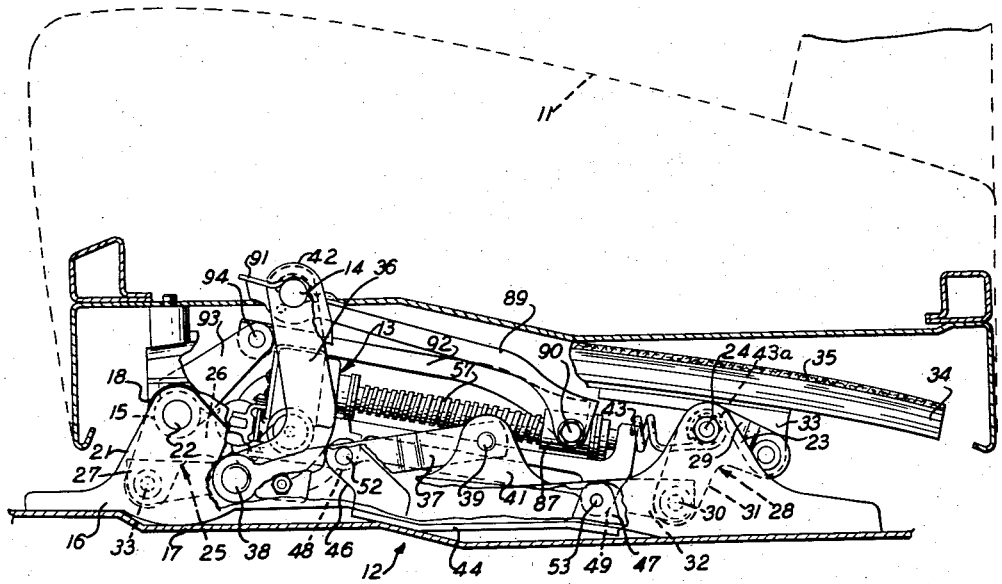
FIG. 2 is a side elevational view partially in section and partially cut away, the seat being shown supported in a rearwardly and downwardly position.
Figure 3:
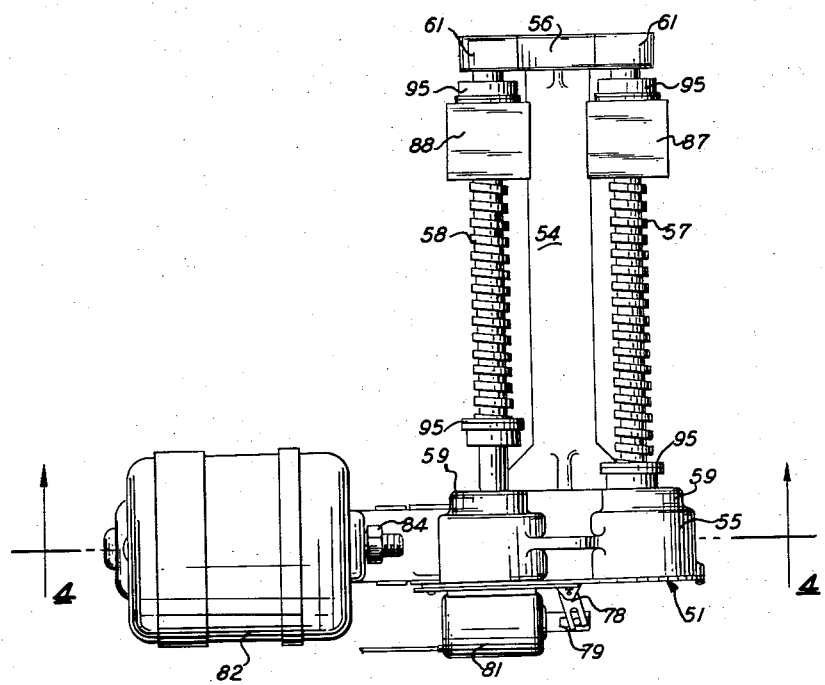
FIG. 3 is a plan view of the seat adjuster mechanism.

As will be readily understood, the vehicle seat 11 is adapted to be supported at each side thereof on suitable structures providing for raising and lowering and fore and aft movements of the seat. The support structures at each side of the seat are basically similar except that only one of the structures is directly coupled to a power unit for motivation. It is the structure or mechanism, generally designated 12, having the motor drive unit 13 coupled thereto, which is depicted in FIGS. 1 and 2. The motivating force is transmitted from the mechanism 12 to the mechanism (not shown) at the other side of the seat by means of horizontal and vertical stabilizer bars 14 and 15, respectively, as will be further explained.

The supporting and positioning mechanism 12 for each end of the seat 11 comprises a channel-shaped base member 16 adapted to be suitably secured to the vehicle body floor 17. It will be understood that the base member is substantially U-shaped with the base 18 thereof bolted to the vehicle floor by bolts 19, see FIG. 1. The base member 16 is provided with upstanding support portions 21 at its forward end adapted to receive a horizontally extending pivot shaft 22. Similar upstanding support portions 23 at the rear end receive a pivot shaft 24. Journalled on the forward pivot shaft 22 are a pair of bell crank or seat track actuating levers 25. Each bell crank 25 has a substantially horizontally extending arm 26 and a depending arm 27. The rear pivot shaft 24 is provided with a similar pair of bell crank or seat actuating levers 28. Each bell crank 28 has a substantially horizontally extending arm 29 and a depending arm 31.

The depending bell crank arms 27 and 31 are linked by a channel-shaped member or synchronizing link 32 which is connected by pivot shafts 33 to the respective bell crank arms 27 and 31. The member 32 also functions to maintain the respective pairs of bell cranks 25 and 28 in proper spaced relationship to each other. The horizontally extending arms 26 and 29 of each pair of bell cranks 25 and 28 are pivotally connected to depending support members, such as the rear support member 33 shown in FIG. 2. The rear support member 33 and the equivalent support member (not shown) at the front are secured to the substantially horizontally but slightly curved track member 34. The track member 34 slidably supports the slide member 35 to which the seat is fastened.

It will be readily apparent that when the bell cranks 25 and 28 are swung in unison in a counterclockwise direction of movement as viewed in FIG. 2, the free ends of the horizontal arms 26 and 29 will be raised. This will cause the track member 34, the slide member 35 and the seat 12 to be bodily lifted. Swinging movement of the bell cranks 25 and 28 in a clockwise direction will lower the seat and its supporting members.

Before explaining the manner in which the bell cranks 25 and 28 are motivated to provide the raising or lowering of the seat 11, the linkage controlling the seat movements in a fore and aft direction will be described. This linkage comprises a substantially vertically extending torsion bar link 36 and a substantially horizontally extending guide link 37 pivotally connected to each other at 38. The guide link is pivotally connected at 39 to an upstanding support portion 41 of the base member 16. The upper end of the torsion bar link 36 is fixed, as by welding, to the end of the horizontal stabilizer bar 14, the latter being journalled in a support member 42 welded or otherwise attached to the upper slide member 35.

A suitable counterbalance spring 43 is provided. The spring 43, only a fragmentary portion of which is shown, is hooked at one end 43a to the pivot 24 and at its other end to the synchronizing link 32.

The foregoing description of the seat supporting and positioning structure has been presented rather briefly since the basic structure is known and used on motor vehicles. As was briefly stated above, motivation of the seat positioning mechanism is obtained by means of an improved motor drive unit 13.

It will be noted, see FIG. 2, that the base member 16 has secured to it a plate 44, the latter being securely spot-welded to the base member and having a shelf forming portion projecting beyond the base member inner edge. The shelf forming portion receives a support bracket 45, see FIG. 1, which is spotwelded to the shelf forming portion and to the side leg of the channel-shaped member 16. The support plate 45 has securely mounted thereon a channel-shaped front support member 46 and a channel-shaped rear support member 47 (see FIG. 2). The support members 46 and 47 receive depending leg portions 48 and 49 of a combination cradle and gear housing member 51. The depending leg portions 48 and 49 of the member 51 are retained on the respective supports 46 and 47 by releasable pins 52 and 53. This is to permit the entire motor drive unit 13 to be easily removed for servicing, if necessary.

The member 51 comprises a longitudinally extending beam portion 54 provided at its forward end with an integral housing portion 55 having several chambers containing various gears and shafts, as will be explained. At its rear end the beam 54 is provided with a smaller integral housing portion 56. Extending between the two housing portions 55 and 56 are a pair of screws 57 and 58 located in parallel spaced relation on either side of the beam portion 54. Each screw is journalled adjacent its forward end in suitable bearings or bushings (not shown) contained within the retainer portions 59 in the integral housing portion 55 and at its rear end in suitable bearings or bushings (not shown) contained within the retainer portions 61 of the integral housing portion 56.

Figure 4:
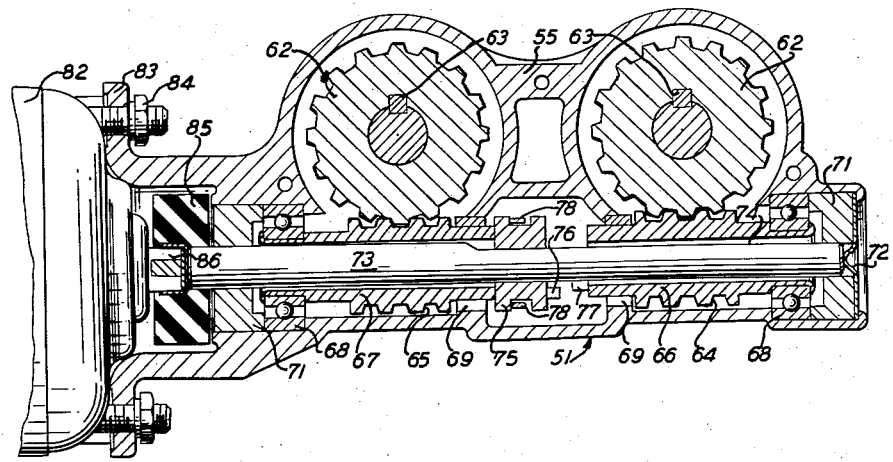
FIG. 4 is a sectional view taken substantially along the line 4—4 of FIG. 3 looking in the direction of the arrows.

The extreme forward end of each screw 57 and 58 has coupled thereto a worm gear 62, the gears being splined or keyed to the shafts as by keys 63. Each gear 63 is in mesh with a worm, the latter being designated 64 and 65, respectively. The worms 64 and 65 are integral with elongated tubular worm carrying shafts 66 and 67. Each worm shaft is journalled at its outer end in a suitable roller thrust bearing 68 and at its inner end in a bushing 69. Each bearing 68 is in abutting relation to a bushing or bearing 71. A suitable seal or cover plate 72 is provided at the right end of the housing 55 as viewed in FIG. 4.

An elongated shaft 73 is provided which extends through the hollow worm shafts 66 and 67. It will be noted that the shaft 73 is provided with a milled flat 74 for a substantial portion of its length. Keyed to the shaft 73 by the flat 74 is a longitudinally slidable clutch element 75. The clutch element 75 is provided at each side thereof with jaw elements 76 adapted to selectively interlock with corresponding jaw elements 77 on the inner ends of the respective worm shafts 66 and 67. The clutch element 75 is shown as engaged with the worm shaft 67 but is adapted to be shifted into engagement with the worm shaft 66 by a forked lever 78 coupled to the plunger 79 of a solenoid 81.

The shaft 73 is coupled to an electric motor 82 mounted on an end flange 83 of the housing 55. The motor is retained in position by suitable bolts 84. The coupling 85, drivingly connecting the motor shaft 86 to the shaft 73 is illustrated as a rubber sleeve type coupling relying on frictional engagement with the shaft 73 for the transmission of power from the motor shaft. The coupling 85 is keyed to the motor shaft in any convenient manner.

Each screw 57 and 58 is provided with a travelling nut 87 and 88, respectively. Each travelling nut has coupled thereto a link adapted to transmit the longitudinal movement of the nut along the screw to the seat supporting and positioning mechanism. For example, the nut 87 has one end of a link 89 swingably coupled to it by pivot studs 90. The other end of the link 89 is swivelly clamped by a clamp device 91 to the horizontal stabilizer bar 14 which has been described as being directly connected to the seat slide member 35. Thus, as the nut 87 travels along the screw 57 it either pulls or pushes the slide member 35 along the track 34. This action occurs simultaneously at both sides of the seat through the agency of the horizontal stabilizer bar 14 which operatively connects the seat supporting and positioning mechanisms at each side of the seat.

Raising and lowering movement of the seat is in response to movement of the nut 88. The movement of this nut is transmitted through a link 92 to a lever 93, the link 92 and lever 93 being pivotally interconnected at 94. The lever 93 actually comprises two spaced members located at each side of the link 92, the members being welded to the vertical stabilizer bar 15. The turning movement of the vertical stabilizer bar 15 resulting from the movement of the nut 88 along the screw is transmitted to the bell crank lever 25. Movement of this bell crank lever 25 is transmitted to the bell crank lever 28 by link 32. The simultaneous raising or lowering, as the case may be, of the bell crank lever arms 26 and 29 results in a corresponding raising or lowering of the vehicle seat 11. Through the agency of the vertical stabilizer bar interlinking the seat supporting and positioning units on both sides of the seat, the raising or lowering of both sides of the seat is coordinated.

It will be noted that the screws 57 and 58 are provided with stop collars 95 against which the travelling nuts 87 and 88 are adapted to abut at the end of their respective ranges of movement. In the instant embodiment the range of movement of the nut 88 travelling on the screw 58 which screw controls the vertical movement of the seat is somewhat shorter than the effective range of movement of the travelling nut 87 along the screw 57 controlling the horizontal or fore and aft movement of the seat 11.

It will be understood that suitable electrical circuitry and control switches will be provided to control the direction of rotation of the electric motor 82 and the actuation of the solenoid 81. For example, the seat 11 is illustrated in its lowermost and rearmost position. To raise the seat, the appropriate switch will be operated to cause the motor to rotate the vertical screw 58 in a direction to cause the travelling nut to travel from the rear toward the front of the screw. Such movement transmitted from the nut 88 to the linkage system, as above explained, causes the seat to rise. To lower the seat, the control switch is appropriately operated to reverse the direction of rotation of the motor and thereby the direction of the screw 58.

To move the seat in a forward direction, manipulation of the fore and aft control switch is required. When this switch is actuated, both the motor 82 and solenoid 81 are energized. The clutch element 75 is shifted out of engagement with the worm shaft 67 into engagement with the worm shaft 66 thereby causing the rotation of the motor 82 to be transmitted to the horizontal screw 57, that is, the screw controlling fore and aft movement of the seat. This occurs whether it is desired to move the seat in either a fore or aft direction.

The advantages of the foregoing structure are believed readily apparent now that the structure has been described in detail. The positioning of the screws 57 and 58 in parallel spaced relationship provides a much shorter and more compact unit than a tandem screw arrangement. By permitting the clutch element to remain in operative relationship to one side of the power train and to be shiftable in engagement with the other side of the power train, only a single solenoid and clutch element are required. This results in an immediate saving in the cost of manufacture of the mechanism.

It will be understood that the invention is not to be limited to the exact construction shown and described, but that various changes and modifications may be made without departing from the spirit and scope of the invention, as defined in the appended claims.

What is claimed is:

1. A motor drive unit adapted to be coupled to a four-way seat adjuster mechanism comprising a support frame having a longitudinally extending beam portion and upstanding appendages at each of its ends, a pair of rotatable screws journalled at each of their ends in said appendages, said screws lying in proximate parallel relationship to the longitudinal axis and upon opposite sides of said beam portion, nut means carried on said screws for movement therealong between said appendages, a motor mounted on one of said appendages, a shaft coupled to said motor and journalled within said one appendage with its longitudinal axis at a right angle to the longitudinal axis of said beam portion, said shaft carrying a pair of drive elements engaged with driven elements carried on the respective screws, and selectively positionable clutch means carried by said shaft between said drive elements coupling one or the other of the latter and thereby a respective one of said screws to said shaft at all times for rotation by said motor means.

2. A motor drive unit adapted to be coupled to a four-way seat adjuster mechanism comprising a support frame having a longitudinally extending beam portion and upstanding appendages at each of its ends, a pair of rotatable screw journalled at each of their ends in said appendages, said screws lying in proximate parallel relationship to the longitudinal axis and upon opposite sides of said beam portion, nut means carried on said screws for movement therealong between said appendages, a motor mounted on one of said appendages, a shaft coupled to said motor and journalled within said one appendage with its longitudinal axis at a right angle to the longitudinal axis of said beam portion, worm and gear means interposed between said shaft and each of said drive screws, and clutch means carried by said shaft between the worms selectively coupling one or the other of the latter to said shaft for rotation by said motor means, at least one of said worms being coupled to said shaft at all times.

3. A motor drive unit adapted to be coupled to a four-way seat adjuster mechanism comprising a support frame having a longitudinally extending beam portion and upstanding integral housing portions at each of its ends, a pair of rotatable screws extending between and journalled at each of their ends in said housing portion, said screws lying in fixed parallel relationship to the longitudinal axis of said beam portion, traveling means carried on said screws for movement therealong between said housing portions, a motor mounted on one of said housing portions, a shaft coupled to said motor and journalled within said one housing portion with its longitudinal axis at a right angle to said beam portion, a pair of drive elements on said shaft, driven elements engaged with said drive elements, said driven elements being coupled to the ends of the respective screws journalled in said one housing, and selectively positionable clutch means carried by said shaft between said drive elements coupling one or the other of the latter and thereby a respective one of said screws to said shaft at all times for rotation by said motor means.

4. A motor drive unit adapted to be coupled to a four-way seat adjuster mechanism comprising a support frame having a longitudinally extending beam portion and upstanding integral housing portions at each of its ends, a pair of rotatable screws extending between and journalled at each of their ends in said housing portion, said screws lying in fixed parallel relationship to the longitudinal axis of said beam portion, traveling means carried on said screws for movement therealong between said housing portions, a motor mounted on one of said housing portions, a shaft coupled to said motor and journalled within said one housing portion with its longitudinal axis at a right angle to said beam portion, the longitudinal axis of said shaft lying at one side of a common plane defined by the longitudinal axes of said screws, a pair of drive elements on said shaft, driven elements engaged with said drive elements, said driven elements being coupled to the ends of the respective screws journalled in said one housing, and selectively positionable clutch means carried by said shaft between said drive elements coupling one or the other of the latter and thereby a respective one of said screws to said shaft at all times for rotation by said motor means.

References Cited in the file of this patent

UNITED STATES PATENTS

| 1,533,626 | Wilson | Apr. 14, 1925 |
| 1,628,309 | Davis | May 10, 1927 |
| 1,814,424 | Barr | July 14, 1931 |
| 2,803,146 | Brundage | Aug. 20, 1957 |
| 2,837,930 | Desmond | June 10, 1958 |
| 2,886,094 | Pickles | May 12, 1959 |
| 2,922,462 | Kalvaitis | Jan. 26, 1960 |

FOREIGN PATENTS

| 1,123,195 | France | June 4, 1956 |